Inventors
Zacchetti Edvino
Luige BerTrandi

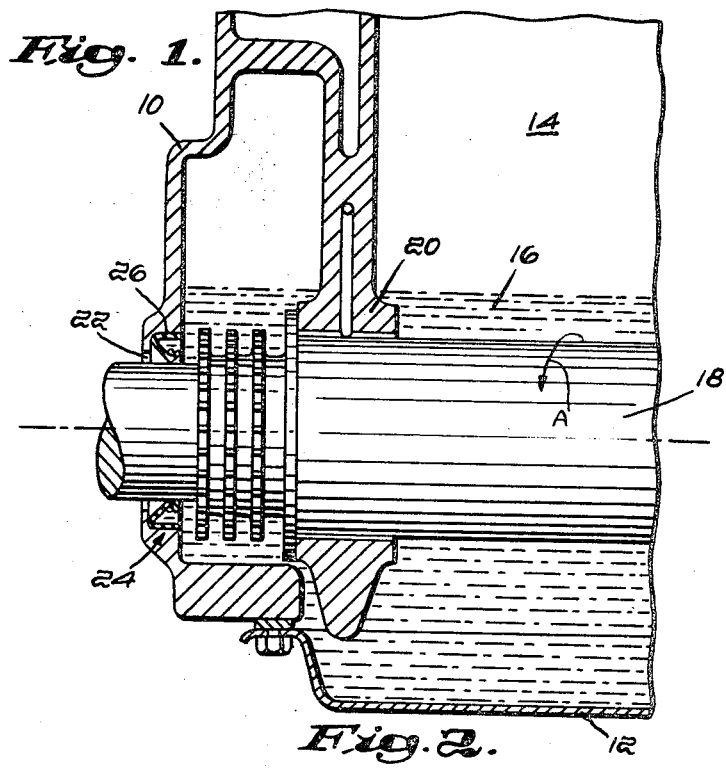
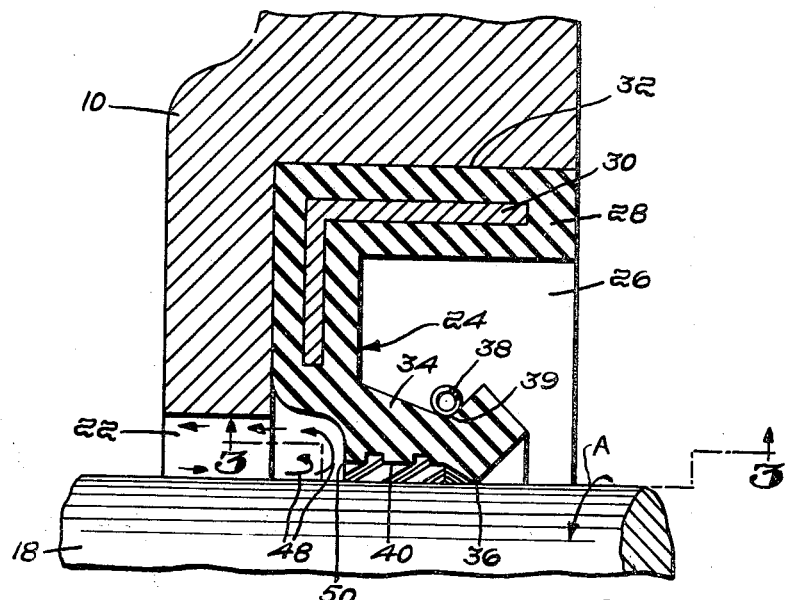

Inventors
Zacchetti Edvino
Luige Bertrandi

United States Patent Office 3,482,845
Patented Dec. 9, 1969

3,482,845
OIL SEAL
Luigi Bertrandi and Edvino Zacchetti, Torino, Italy, assignors to MICUS-Immobiliar und Finanzierung Anstalt-Triesen Liechtenstein, County of Liechtenstein, a corporation
Continuation-in-part of application Ser. No. 498,290, Oct. 20, 1965. This application Sept. 12, 1967, Ser. No. 719,278
Claims priority, application Switzerland, Feb. 22, 1965, 2,433/65
Int. Cl. F16j 15/32, 15/54
U.S. Cl. 277—134         4 Claims

ABSTRACT OF THE DISCLOSURE

A rotary shaft oil seal comprises an annular rubber seal adapted to be fixed in housing in a position encircling the shaft to be sealed. The seal has a sharp inner sealing lip that contacts the shaft which is effective to prevent leakage under static conditions. Adjacent the sealing lip is a first set of inclined hydrodynamic grooves that act to repel any fluid leaking under the sealing lip when the shaft is rotating in one direction. A second set of outer oppositely inclined hydrodynamic grooves are also carried by the seal and are effective to prevent leakage when the shaft is rotating in the opposite direction.

This application is a continuation-in-part of application Ser. No. 498,290, "Oil Seal," filed Oct. 20, 1965, and now abandoned.

This invention relates generally to rotary shaft seals and more particularly to an improved seal construction for preventing loss of fluid between a rotary shaft and its housing during both static and dynamic conditions, regardless of the direction of shaft rotation.

A number of prior art seal constructions have been developed in an effort to provide an effective means of preventing fluid leakage between a rotary shaft and its housing. These devices may be grouped into the following three basic categories: (a) continuous contact seals; (b) labyrinth type seals; and (c) hydrodynamic seals.

The continuous contact seals, which include face and lip type seals, packings, O-rings, etc., supposedly provide effective sealing by pressing a resilient seal material against the surface of the shaft. At moderate speeds, with smooth shaft surfaces and without shaft vibration, these seals function relatively well. However, where shaft vibration is encountered, as is usually the case under high speed running conditions, leakage invariably takes place when the contact between the resilient seal material and shaft is broken. Efforts have been made to alleviate this problem by providing means for forcing the sealing material against the shaft, as for example by surrounding a lip seal with a garter spring. In such cases, however, friction between the sealing elemnt and the shaft has been markedly increased due to the excessive forces required to maintain continuous contact between the seal and shaft under high speed running conditions. Friction in turn accelerates wear, particularly where the shaft surfaces are not absolutely smooth. In addition, the heat generated by excessive frictional contact causes the physical characteristics of the seal material to degrade at an accelerated rate.

The labyrinth type seal differs from the continuous contact seals in that no attempt is made to press a sealing element against the shaft. Instead, a space is purposely maintained between the seal element and shaft, with leakage being controlled by forcing the escaping liquid to travel a circuitous path. However, some leakage loss must deliberately be accepted with this type of seal. Moreover, these seals are totally ineffective under static conditions.

In contrast to the seals described above, hydrodynamic seals utilize a fundamental principle which directly attacks the source of most sealing problems by eliminating the energy gradient which encourages fluid flow. To explain, in a hydrodynamic seal, the shaft and its surrounding sealing element are spaced with threads or inclined grooves being provided on either the shaft or the opposed surface of the sealing element. As the shaft rotates, fluid adheres to the opposed rotating and stationary surfaces and a viscous drag is created which in turn imparts both a radial and an axial force component to the fluid. By properly inclining the threads or grooves in relation to the direction of shaft rotation, an axial force component is directed inwardly towards the housing to oppose any tendency of liquid to escape therefrom. If the inwardly directed axial force component is greater than or equal to the internal liquid pressure tending to generate an outward flow from the housing, absolute sealing is assured. This is to be contrasted to labyrinth type seals where leakage is only controlled and not totally eliminated. Moreover, since the sealing element in a hydrodynamic seal does not come into actual contact with the surface of the rotating shaft, frictional wear is for all practical purposes eleminated.

However, in spite of the above-decided advantage, hydrodynamic seals have failed to gain widespread use because of other problems which have heretofore remained unsolved by those skilled in the art. For example, hydrodynamic seals are speed sensitive, with a total lack of any sealing capability under static conditions. Moreover, conventional hydrodynamic seals are unidirectional, generally sealing in one direction and pumping in the other. Thus, under static conditons, or when the direction of shaft rotation is reversed, the prior art hydrodynamic seals fail to prevent leakage of fluid from the housing.

The above problems have now been obviated by the present invention, an object of which is to provide an improved seal assembly of novel construction which effectively prevents fluid leakage between a shaft and its housing under both static and dynamic conditions.

Another object of the present invention is to provide a seal assembly which is fully effective, regardless of the direction of shaft rotation.

A further object of the present invention is to reduce frictional contact between seal components and the rotary shaft.

A still further object of the present invention is to provide a seal construction embodying the principles of sliding contact and hydrodynamic sealing in a manner which effectively prevents escape of fluid from the housing along the surface of a rotating shaft.

These and other objects of the present invention will become more apparent as the description proceeds with the aid of the accompanying drawings in which:

FIG. 1 is a sectional view showing a seal according to the present invention positioned on a shaft extending through the wall of a housing containing fluid;

FIG. 2 is a greatly enlarged sectional view of a portion of the seal construction shown in FIG. 1;

Figure 3:
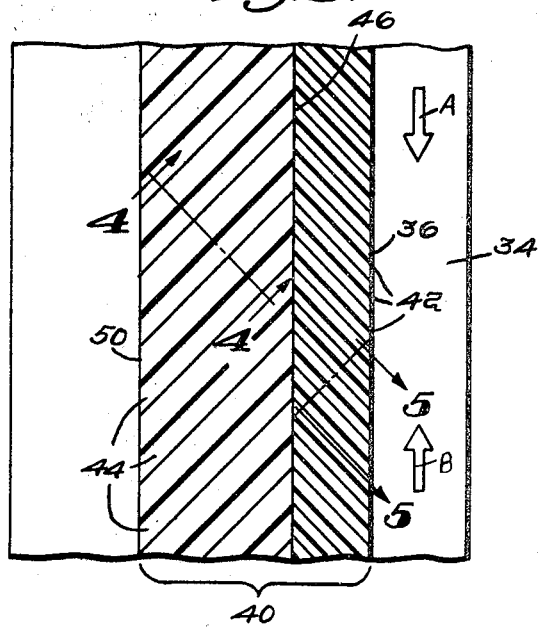
FIG. 3 is an enlarged sectional view taken along line 3—3 of FIG. 2 showing the arrangement of hydrodynamic grooves on a portion of the sealing lip.

Referring initially to FIGS. 1 and 2, a housing 10 is shown closed at the bottom by a removable base cover 12 to define an enclosure 14 containing a fluid, as for example lubricating oil 16. A shaft 18 is enclosed by housing 10 and journaled on shaft bearings, one of which is indicated in FIG. 1 by the reference numeral 20. One end of the shaft 18 protrudes outwardly from housing 10 through an aperture 22, where it may either drive or be driven by other machine components which have not been shown since they are not particularly pertinent to the description of the present invention.

A seal assembly according to the present invention and generally indicated by the reference numeral 24 is positioned within an annular recess 26 in housing wall 10 adjacent aperture 22 in order to prevent leakage of lubricating oil 16 along the surface of shaft 18. As can be better seen in FIGS. 2–5, seal assembly 24 is comprised of a ring 28 of resilient material such as, for example, vulcanized rubber. Where desirable, the ring may be internally reinforced by use of an imbedded annular metal insert 30 (see FIG. 2). The outer diameter of the seal is such that it will bear against the inner surface of recess 26 as at 32, thus maintaining the seal in place in fixed relationship relative to the housing wall during rotation of shaft 18.

Ring 28 is formed with an annular lip 34 having a relatively sharp edge 36 in sliding contact with the surface of shaft 18. Where desirable, tensioning means such, as for example, a metal garter spring 38 may encircle the annular lip 34 in order to urge the sharp edge 36 into contact with the shaft 18. At this point, it should be noted that with a seal construction according to the present invention, a tensioning means such as garter spring 38 can be employed without materially increasing frictional wear. This is due primarily to the following two factors: first, sharp edge 36 need only be urged against the surface of shaft 18 with a force necessary to maintain contact under static and low speed operating conditions. As the rotational speed of shaft 18 is increased, a hydrodynamic sealing principle to be hereinafter described will take over the sealing function. Secondly, by properly positioning garter spring 38 in relation to edge 36, the inward radial force that is exerted by the spring can be directed towards the sealing edge without causing any substantial seal deformation. For example, as shown in FIG. 2, spring 38 is seated in a notch 39 in near radial alignment with edge 36, thus concentrating its force on the narrow area of sliding contact between the seal and shaft 18 without distortion of lip 34.

Annular lip 34 is further provided on the outboard side of edge 36 with an inner face 40 spaced radially from the surface of shaft 18. As herein shown, a substantial portion of face 40 is disposed parallel to the rotational axis of shaft 18. However, as will hereinafter become more apparent, this parallel relationship need not be maintained in all cases.

Figure 4:
FIG. 4 is a sectional view taken along line 4—4 of FIG. 3.
Figure 5:
FIG. 5 is a sectional view taken along line 5—5 of FIG. 3.

As can be best seen in FIGS. 3 to 5, inner face 40 is provided with a first set of circumferentially disposed hydrodynamic grooves indicated typically by the reference numeral 42 positioned immediately adjacent edge 36. Grooves 42 are inclined relative to the axis of the seal in the same general direction as that of principal shaft rotation, herein diagrammatically shown for illustrative purposes by the arrows A in FIGS. 1, 2 and 3 as being clockwise. A second set of grooves 44 is also formed in the inner face 40 of annular lip 34 immediately adjacent to the first set of grooves 42. The two sets of grooves 42 and 44 meet along a line 46 to define a herringbone pattern. As herein shown, the grooves in the second mentioned set 44 are larger in depth, pitch and width than the grooves 42 in the first mentioned set. However, this particular relationship need not be maintained in all cases and it should be understood that the particular dimensions and arrangement of each set of grooves will vary depending on a number of variables such as the rotational speed of the shaft, the viscosity of the liquid in housing 10, as well as other factors such as temperature, shaft roughness, etc.

In view of the above, it can be seen that a seal according to the present invention embodies two basic sealing principles. First, there is provided means in the form of a sharp edge 36 which bears against the surface of shaft 18 to provide an effective seal under static and low speed operating conditions. Secondly, there is provided two sets of oppositely inclined hydrodynamic grooves 42 and 44, which grooves cooperate in a novel manner to be hereinafter described in providing an effective seal under dynamic conditions, regardless of the direction of shaft rotation.

Operation under static and low speed operating conditions

Under static and low speed operating conditions, the edge 36 of sealing lip 34 will be urged against the surface of shaft 18. Thus, the viscosity of the lubricating oil 16 in housing 10 will effectively prevent oil from escaping under edge 11. As herein used, the term "low speed operating conditions" is intended to define a shaft rotational speed range extending from the static condition to a rotational speed at which shaft vibrations become pronounced. Depending on the seal materials being used, the natural resiliency of the seal may exert sufficient pressure on the shaft. However, additional means such as the garter spring 32 may be provided. In any event, it is important to note that the pressure required to press edge 36 against shaft 18 need only be great enough to insure effective sealing under static and low speed operating conditions where troublesome shaft vibration has not yet developed. This is to be contrasted to conventional lip seals where a much greater pressure must be utilized in order to overcome the tendency of the seal to separate from the shaft during high speed rotation.

Seal operation under high speed dynamic conditions: clockwise rotation of shaft

As the rotational speed of shaft 18 begins to accelerate in a clockwise direction, ordinary shaft vibrations will tend to pull the surface of the shaft away from the sharp edge 36 of sealing lip 34. As previously indicated, although the garter spring 38 is of sufficient strength to maintain a constant surface contact between edge 36 and the surface of the shaft under static and low speed conditions, its strength is so calculated as to permit interruption of this surface contact caused by shaft vibration during high speed operation. As the shaft vibrates and periodically jumps away from edge 36, a small amount of lubricating oil will seep between lip 34 and the surface of the shaft. This is advantageous in that this oil will form a film between edge 36 and the surface of the shaft, thus providing a means of lubricating this narrow area of frictional contact between the seal and the shaft. Any oil which has succeeded in passing beneath edge 36 will thereafter have a tendency to momentarily adhere to both the surface of the shaft and the stationary inner face 40 of sealing lip 34. The viscous drag imparted by the first set of inclined hydrodynamic grooves 42, which grooves are inclined relative to the seal axis in the same direction as the clockwise rotation of the shaft, will impart both a radial and axial force component to the fluid. The axial force component will be directed along the surface of shaft 18 towards the interior of housing 10, thus providing a repelling action opposing the escape of fluid from beneath edge 36. By properly selecting the angle of groove inclination as well as the groove width and depth in relation to the viscosity of the liquid in housing 10, the outward flow of liquid from beneath edge 36 will be halted at some point, hereinafter referred to as the "point of flow equilibrium," located between edge 36 and dividing line 46. This point will of course vary somewhat, depending on various factors such as viscosity, temperature, rotational speed of shaft 18, etc. For example, if the rotational speed of shaft 18 is decreased, the point of flow equilibrium will move toward line 36. By the same token, if the rotational speed of the shaft is increased, the point of flow equilibrium will move inwardly towards edge 46. In any event, it should be noted that some penetration of lubricating oil beneath edge 36 is allowed during high speed shaft rotation in order to lubricate this narrow area of sliding contact between the seal and shaft. However, any oil that does penetrate beneath edge 36 is subsequently held in check by the repelling action of the first set of inclined grooves 42.

It should also be noted that during clockwise rotation of shaft 18, air on the outside of housing 10 will also be entrained in a clockwise rotational flow with the shaft. The outer set of grooves 44 will exert a repelling action on the air similar to that described above in connection with grooves 42, but in an opposite direction, thus creating a reverse arcular air flow indicated diagrammatically in FIG. 2 by the arrows 48. It is believed that this reverse flow of air will have a tendency to force particles of dust and grit away from the annular space existing between the inner face 40 of sealing lip 34 and the surface of shaft 18, thus preventing contaminaton of the lubricating oil 16 in housing 10 should some air be drawn into the housing by the pumping action of the first set of grooves 42.

In other words, the two sets of oppositely inclined grooves 42 and 44 on the inner surface 40 of sealing lip 34 will exert a two-way opposed pumping action during rotation of shaft 18 in a counterclockwise direction. Grooves 42 will cooperate with oil which has seeped past edge 36 and which is entrained with shaft 18 to exert a repelling action tending to prevent leakage from housing 10. By the same token, grooves 44 will exert a similar pumping action in an opposite direction tending to exclude air from the interior of the housing.

Seal operation under high speed dynamic conditions:
counterclockwise rotation of shaft When shaft 18 is rotated in a counterclockwise direction, the inclination of the first set of grooves 42 will now be in a direction opposite to shaft rotation as shown diagrammatically in FIG. 3 by arrow B. As the rotational speed of the shaft is increased and vibrations are again encountered, oil will have a tendency to seep beneath edge 11 in much the same manner as described above in connection with clockwise rotation of the shaft. However, once oil has succeeded in seeping beneath edge 11, it will be entrained with the surface of the shaft and because grooves 42 are now inclined in a direction opposite to that of shaft rotation, the oil will be forced directly into grooves 42. The oil will travel along grooves 42 until it reaches dividing line 46 at which point, the oil will encounter the set of oppositely inclined grooves 44, which grooves are now inclined in the same direction as that of shaft rotation. The hydrodynamic grooves 44 will at this point exert a repelling action on the oil which has succeeded in penetrating the length of grooves 42, and a state of equilibrium will again be reached at some point between dividing line 46 and the outer edge 50 of grooves 44. This point of equilibrium will again drift between line 46 and edge 50, depending on a number of variables such as oil temperature viscosity and the speed of shaft rotation.

It can therefore be seen that should the rotational direction of the shaft be reversed, grooves 44 will provide a second hydrodynamic barrier preventing the escape of lubricating oil from the seal following its seepage beneath edge 36. In this manner, an effective seal is assured for both clockwise and counterclockwise rotation.

Figure 6:
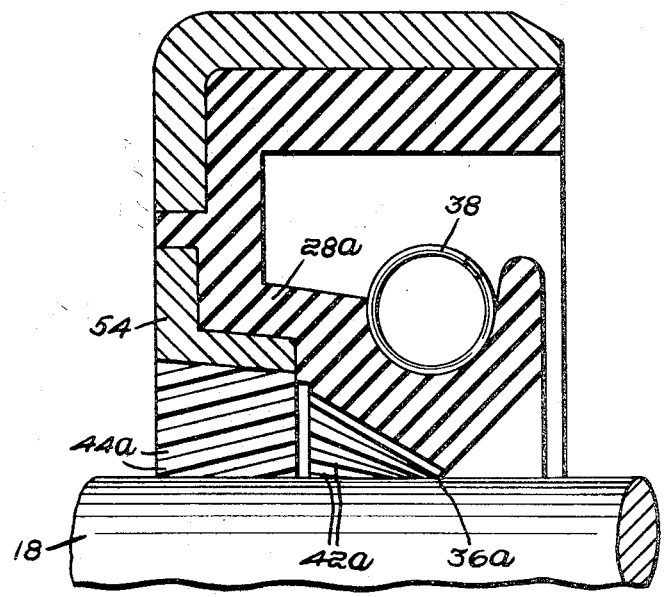
FIG. 6 is a sectional view similar to FIG. 2 showing an alternate embodiment of the invention.
Figure 7:
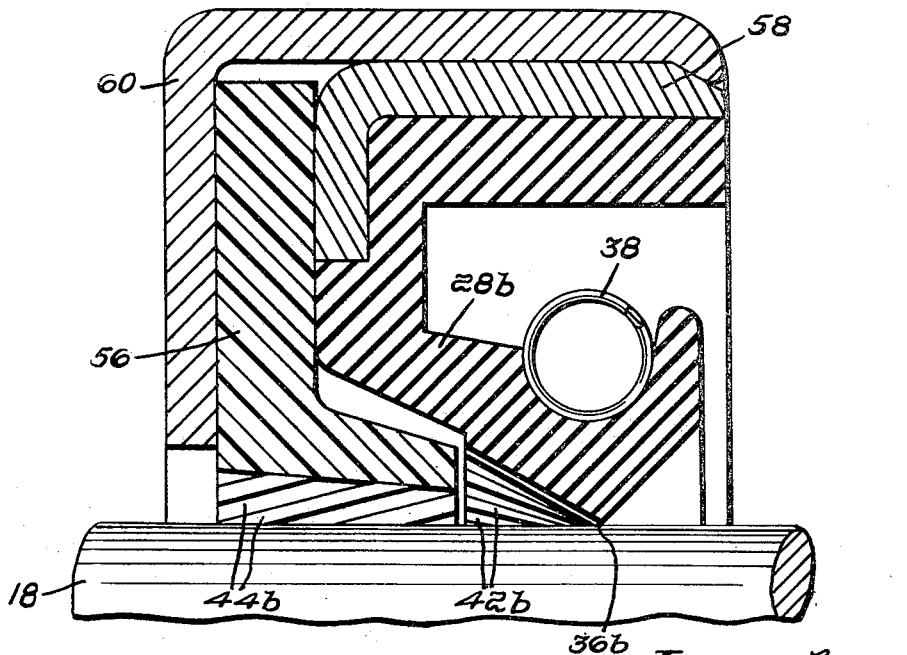
FIG. 7 is a sectional view similar to FIGS. 2 and 6 showing still another modified version of the invention.

Referring now to FIGS. 6 and 7, alternate embodiments of the invention are illustrated wherein the oppositely inclined sets of hydrodynamic grooves are not formed on one integral sealing component. For example, in FIG. 6, a sealing ring 28a of resilient material contacts the surface of shaft 18 with a sharp edge 36a and is further provided with a first set of inclined hydrodynamic grooves 42a immediately adjacent edge 36a. However, the second set of grooves indicated by the reference numeral 44a are formed on a metal bushing 54 attached by any known means as for example by vulcanization to ring 28a.

In FIG. 7, a metal bushing 60 contains two elements; an outer rubber ring 56 containing a set of grooves 44b and an inner sealing ring 28b with grooves 42b and sealing edge 36b, which is urged against shaft 18 by garter spring 38. Element 28b is contained in a separate metal bushing 58 which fits within bushing 60.

Figure 8:
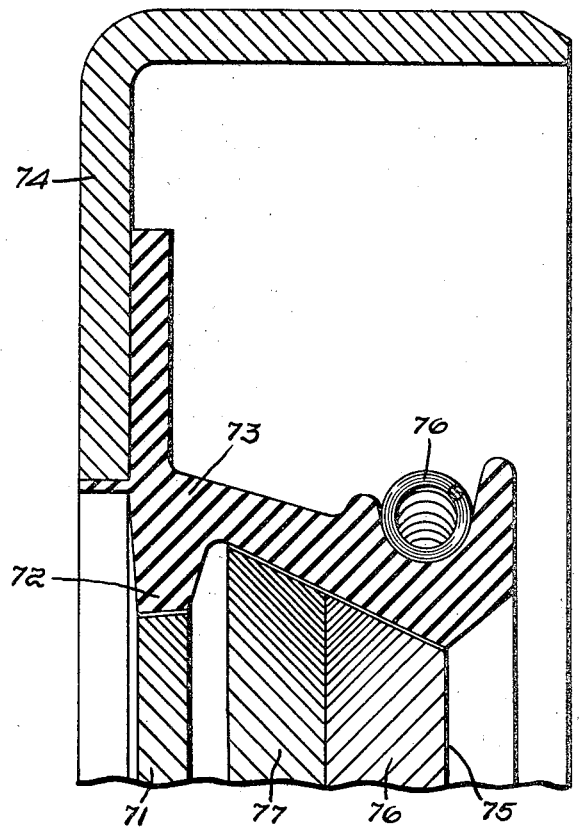
FIG. 8 is another sectional view showing another modification.

The alternative embodiment shown in FIG. 8 is characterized by the fact that the outer sealing grooves 71 are carried on a thinner ring 72 of sealing ring 73. This is a more flexible arrangement than those shown in the previous figures and permits the grooves 71 to be more closely spaced to and to more closely follow the shaft at high speeds because the thickness of the rubber is less. The area of contact presented by groove 71 when it occurs as a result of vibration is less. The remainder of the seal is as before, i.e., the sealing ring 73 is contained in bushing 74 and has a knife edge seal 75 which is urged against the shaft by a garter spring 76, adjacent to which are the minor set of hydrodynamic grooves 76. Also shown are a third set of hydrodynamic grooves 77, although these are not essential to this embodiment.

Figure 9:
FIG. 9 is an enlarged cross-sectional view of the grooves for the embodiment shown in FIG. 8.

FIG. 9 illustrates in enlarged cross-section 79 the preferred shape of grooves for the embodiment shown in FIG. 8.

The design shown in FIGS. 8 and 9 is particularly preferred for equipment that may run for some time at high speeds in reverse, such as is the case with railroad engines. The efficiency of the second set of grooves 71 is of course greater since they are nearer the shaft. Their efficiency preferably does not however exceed that of the first set of grooves 76.

In view of the above, it shall now be apparent to those skilled in the art that alternate embodiments of the invention may be constructed wherein the oppositely inclined sets of hydrodynamic grooves are either formed on one integral seal component or on separate components. In any event, the concept of two oppositely inclined sets of hydrodynamic grooves positioned adjacent one another and preceded by a sharp edged lip seal is common to all of the embodiments herein disclosed. With this type of construction, effective sealing is assured under both static and dynamic conditions, regardless of the direction of shaft rotation. Moreover, since the shaft is slidably contacted by only a relatively sharp edge 36, the oppositely inclined sets of hydrodynamic grooves remaining spaced from the surface of the shaft, friction is to a considerable extent minimized with the resulting decrease in seal wear.

It is our intention to cover all changes and modifications of the invention herein chosen for purposes of disclosure which do not depart from the spirit and scope of the invention.

We claim:
1. For use in preventing leakage of fluid between a rotary shaft and housing under both static and dynamic conditions, a shaft seal comprising: an annular seal body adapted to be fixed relative to said housing in a position encircling said shaft, said body having a circumferential inwardly disposed face spaced radially from the surface of said shaft; a sealing lip on said seal body in contact with the surface of said shaft, said sealing lip being effective under static and low speed operating conditions to prevent escape of fluid from said housing along said shaft; and, hydrodynamic means on said inner face for preventing flow of fluid from the interior of said housing along the surface of said shaft under high speed dynamic conditions comprising at least two sets of oppositely inclined grooves arranged in distinct rows spatially of each other downstream of said flow from said sealing lip, said hydrodynamic means being effective for both clockwise and counterclockwise shaft rotation.

2. The apparatus as set forth in claim 1 further characterized by said sets of grooves arranged in a substantially herringbone pattern.

3. The apparatus as set forth in claim 1 further characterized by means for urging said sealing lip into contact with the surface of said shaft.

4. The apparatus as set forth in claim 1 further characterized by the radial distance between the surface of said shaft and the second set of hydrodynamic grooves being such that the air entrained by rotation of said shaft in one direction will be repelled from the area adjacent said sharp edge.

References Cited

UNITED STATES PATENTS

| | | | |
|---|---|---|---|
| 1,811,588 | 6/1931 | Moreau | 277—134 |
| 2,188,857 | 1/1940 | Chievitz | 277—134 X |
| 2,446,380 | 8/1948 | Meyers et al. | 277—134 X |
| 2,606,779 | 8/1952 | Jagger | 277—134 |

FOREIGN PATENTS

| | | |
|---|---|---|
| 1,153,578 | 8/1963 | Germany. |
| 888,198 | 1/1962 | Great Britain. |

SAMUEL ROTHBERG, Primary Examiner